US010649739B2

(12) United States Patent
Burges et al.

(10) Patent No.: US 10,649,739 B2
(45) Date of Patent: May 12, 2020

(54) FACILITATING APPLICATION DEVELOPMENT

(71) Applicant: MICROSOFT TECHNOLOGY LICENSING, LLC, Redmond, WA (US)

(72) Inventors: Christopher John Champness Burges, Bellevue, WA (US); Ted Hart, Redmond, WA (US); Andrzej Pastusiak, Redmond, WA (US); Zi Yang, Pittsburgh, PA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 30 days.

(21) Appl. No.: 15/385,477

(22) Filed: Dec. 20, 2016

(65) Prior Publication Data

US 2018/0173500 A1 Jun. 21, 2018

(51) Int. Cl.
*G06F 9/44* (2018.01)
*G06F 9/45* (2006.01)
(Continued)

(52) U.S. Cl.
CPC .................. *G06F 8/10* (2013.01); *G06F 8/20* (2013.01); *G06F 8/30* (2013.01); *G06F 8/36* (2013.01);
(Continued)

(58) Field of Classification Search
CPC ..... G06F 8/10; G06F 8/20; G06F 8/30; G06F 9/453; G06F 9/44505; G06N 5/027
See application file for complete search history.

(56) References Cited

U.S. PATENT DOCUMENTS 7,948,617 B2 * 5/2011 Shubinsky ............. G01N 21/94
356/237.1
10,169,433 B2 * 1/2019 Lerios ................... G06F 16/254
(Continued)

FOREIGN PATENT DOCUMENTS

WO 2016114922 A1 7/2016

OTHER PUBLICATIONS

Kai Yu, An User Interface Dialog Control Model Based on UI Patterns, 2015, pp. 702-705. https://ieeexplore.ieee.org/stamp/stamp.jsp?tp=&arnumber=7339154 (Year: 2015).*
(Continued)

*Primary Examiner* — Mongbao Nguyen
(74) *Attorney, Agent, or Firm* — Shook, Hardy and Bacon, L.L.P.

(57) ABSTRACT

Methods, computer systems, computer-storage media, and graphical user interfaces are provided for facilitating application development. In embodiments, input is received from a designer, the input including an indication of a class of applications and one or more preferences for designing a module specification. Thereafter, the module specification is created in association with the class of applications. Input is received from a teacher in association with the module specification. At least a portion of such input indicates how to recognize when a user intends to run an application. An application is generated based on the input provided from the teacher. Such an application can be used by one or more users.

20 Claims, 15 Drawing Sheets

(51) Int. Cl.

| | |
|---|---|
| ***G06F 9/445*** | (2018.01) |
| ***G06F 8/10*** | (2018.01) |
| ***G06F 8/20*** | (2018.01) |
| ***G06F 8/30*** | (2018.01) |
| ***G06F 8/36*** | (2018.01) |
| ***G06N 5/02*** | (2006.01) |
| *G06F 9/451* | (2018.01) |

(52) U.S. Cl.
CPC ......... *G06N 5/027* (2013.01); *G06F 9/44505* (2013.01); *G06F 9/453* (2018.02)

(56) References Cited

U.S. PATENT DOCUMENTS

| | | | | |
|---|---|---|---|---|
| 2007/0100790 | A1* | 5/2007 | Cheyer | G09B 21/00 |
| 2008/0097748 | A1* | 4/2008 | Haley | G06F 17/2785 704/9 |
| 2010/0017402 | A1* | 1/2010 | Fleming | G06Q 50/20 707/E17.005 |
| 2011/0078105 | A1 | 3/2011 | Wallace | |
| 2011/0252398 | A1* | 10/2011 | Lejeune | G10L 15/22 717/104 |
| 2011/0302553 | A1* | 12/2011 | Gulwani | G06F 9/44 717/107 |
| 2012/0222013 | A1* | 8/2012 | Zheng | G06F 11/3612 717/125 |
| 2013/0152092 | A1* | 6/2013 | Yadgar | G10L 15/19 718/102 |
| 2013/0282757 | A1* | 10/2013 | Ehsani | G06F 8/41 707/770 |
| 2014/0109041 | A1* | 4/2014 | Yunten | G06F 8/34 717/109 |
| 2014/0149845 | A1* | 5/2014 | Ansel | G06F 17/30705 715/234 |
| 2014/0201629 | A1* | 7/2014 | Heck | G06N 5/00 715/708 |
| 2014/0282837 | A1* | 9/2014 | Heise | G06F 21/6245 726/1 |
| 2014/0337814 | A1 | 11/2014 | Kalns et al. | |
| 2014/0344672 | A1* | 11/2014 | Kapoor | G09B 7/00 715/235 |
| 2015/0052496 | A1* | 2/2015 | Helms | G06F 8/34 717/109 |
| 2015/0074546 | A1* | 3/2015 | Slawson | G06F 3/0484 715/747 |
| 2015/0095880 | A1* | 4/2015 | Lee | G06F 8/30 717/108 |
| 2015/0186156 | A1 | 7/2015 | Brown et al. | |
| 2016/0062604 | A1 | 3/2016 | Kraljic et al. | |
| 2016/0171980 | A1* | 6/2016 | Liddell | G10L 15/22 704/275 |
| 2016/0203125 | A1* | 7/2016 | Sarikaya | G10L 15/18 704/9 |
| 2016/0246777 | A1* | 8/2016 | Moldoveanu | G06F 17/279 |
| 2016/0259767 | A1* | 9/2016 | Gelfenbeyn | G06F 8/20 |
| 2016/0266874 | A1* | 9/2016 | Priel | G06F 8/00 |
| 2016/0300156 | A1* | 10/2016 | Bowers | G06F 16/2465 |
| 2016/0350101 | A1* | 12/2016 | Gelfenbeyn | G06F 8/65 |
| 2017/0344656 | A1* | 11/2017 | Koren | G06F 16/958 |
| 2018/0143967 | A1* | 5/2018 | Anbazhagan | G06F 8/30 |

OTHER PUBLICATIONS

Matthias Book, Experiences with a Dialog-Driven Process Model forWeb Application Development, 2005, pp. 1-6. https://ieeexplore.ieee.org/stamp/stamp.jsp?tp=&arnumber=1508107 (Year: 2005).*

Robino, Giorgio, "How to build your first chatbot using ChatScript", https://medium.freecodecamp.com/chatscript-for-beginners-chatbots-developers-c58bb591da8, Retrieved on: Nov. 17, 2016, 13 pages.

Simonite, Tom, "Facebook's Cyborg Virtual Assistant Is Learning from Its Trainers", https://www.technologyreview.com/s/541401/facebooks-cyborg-virtual-assistant-is-learning-from-its-trainers/, Published on: Sep. 18, 2015, 8 pages.

Palermo, Elizabeth, "Supersleuth: Virtual Assistant 'Sherlock' Uses Crowdsourced Knowledge", http://www.livescience.com/52403-new-sherlock-virtual-assistant-software.html, Published on: Oct. 7, 2015, 7 pages.

Catanzariti, Patrick, "How to Build Your Own AI Assistant Using Api.ai", https://www.sitepoint.com/how-to-build-your-own-ai-assistant-using-api-ai/, Published on: Jan. 11, 2016, 29 pages.

Ovenden, James, "Virtual Assistants Need Machine Learning, But They Need People Too", https://channels.theinnovationenterprise.com/articles/virtual-assistants-need-machine-leaming-but-they-need-people-too, Published on: Apr. 15, 2016, 16 pages.

Williams, et al., "Factored Partially Observable Markov Decision Processes for Dialogue Management", In Proceedings of 19th International Joint Conference on Artificial Intelligence, Jul. 30, 2005, 7 pages.

Lison, et al., "OpenDial: A Toolkit for Developing Spoken Dialogue Systems with Probabilistic Rules", In Proceedings of the 54th Annual Meeting of the Association for Computational Linguistics, Aug. 7, 2016, pp. 67-72.

Li, et al., "Scaling Distributed Machine Learning with the Parameter Server", In Proceedings of the 11th USENIX conference on Operating Systems Design and Implementation, Oct. 6, 2014, 16 pages.

"AppBrain—Number of Android applications", http://www.appbrain.com/stats/number-of-android-apps, Published on: 2010, 3 pages.

Boehm, Barry W., "A spiral model of software development and enhancement", In Journal of Computer, vol. 21, Issue 5, May 1988, 25 pages.

Burges, Christopher J.C., "Towards the machine comprehension of text: An essay", In Technical Report MSR-TR-2013-125, Dec. 23, 2013, 8 pages.

Goodfellow, et al., "Deep Learning", In Publication of MIT Press, Nov. 22, 2016, 2 pages.

Hixon, et al., "Learning knowledge graphs for question answering through conversational dialog", In Proceedings of Annual Conference of the North American Chapter of the ACL, May 31, 2015, 851-861 pages.

Hu, et al., "Harnessing deep neural networks with logic rules", In Proceedings of 54th Annual Meeting of the Association for Computational Linguistics, Aug. 7, 2016, 13 pages.

Kim, et al., "Exploring convolutional and recurrent neural networks in sequential labelling for dialogue topic tracking", In Proceedings of the 54th Annual Meeting of the Association for Computational Linguistics, Aug. 7, 2016, 963-973 pages.

Li, et al., "A persona-based neural conversation model", In Proceedings of the 54th Annual Meeting of the Association for Computational Linguistics, Aug. 7, 2016, 994-1003 pages.

Maes, Pattie, "Agents that reduce work and information overload", In Journal of Communications of the ACM, vol. 37, Issue 7, Jul. 1994, pp. 31-40.

Manning, et al., "The Stanford CoreNLP natural language processing toolkit", In Proceedings of 52nd Annual Meeting of the Association for Computational Linguistics, Jun. 22, 2014, 6 pages.

Mueller, Erik T, "Commonsense Reasoning", In Publication of Morgan Kaufmann, Oct. 24, 2014.

Myers, et al., "An intelligent personal assistant for task and time management", In Publication of AI Magazine, vol. 28, No. 2, Jun. 2007, pp. 47-61.

Nguyen, et al., "Deep neural networks are easily fooled: High confidence predictions for unrecognizable images", In Proceedings of IEEE Conference on Computer Vision and Pattern Recognition, Jun. 7, 2015, 427-436 pages.

Pan, et al., "A survey on transfer learning", In Journal of IEEE Transactions on Knowledge and Data Engineering, vol. 22, Issue 10, Oct. 2010, pp. 1-15.

Quirk, et al., "MSR SPLAT, A language analysis toolkit", In Proceedings of the Conference of the North American Chapter of the Association for Computational Linguistics: Human Language Technologies, Jun. 3, 2012, pp. 21-24.

(56) References Cited

OTHER PUBLICATIONS

Richardson, et al., "MCTest: A challenge dataset for the opendomain machine comprehension of text", In Proceedings of the Conference on Empirical Methods in Natural Language Processing, Oct. 18, 2013, pp. 193-203.
Simard, et al., "ICE: Enabling non-experts to build models interactively for large-scale lopsided problems", In Proceedings of Computer Research Repository, Sep. 2014, 10 pages.
Trischler, et al., "A Parallel-Hierarchical Model for Machine Comprehension on Sparse Data", In Proceedings of Computer Research Repository, Mar. 2016, 9 pages.
Tur, et al., "Spoken language understanding: Systems for extracting semantic information from speech", In Publication of John Wiley & Sons, Mar. 2011.
Wang, et al., "Machine comprehension with syntax, frames, and semantics", In Proceedings of 53rd Annual Meeting of the Association for Computational Linguistics, Jul. 26, 2015, 7 pages.
"AI Winter", https://en.wikipedia.org/wiki/AI_winter, Retrieved on: Nov. 22, 2016, 13 pages.
"Predicate (grammar)", https://en.wikipedia.org/wiki/Predicate_(grammar), Retrieved on: Nov. 22, 2016, 5 pages.
Williams, et al., "Fast and easy language understanding for dialog systems with Microsoft Language Understanding Intelligent Service (LUIS)", In Proceedings of the SIGDIAL Conference, Sep. 2, 2015, 159-161 pages.
Williams, et al., "Rapidly scaling dialog systems with interactive learning", In Publication of Springer, 2015, pp. 1-12.
Meek, et al., "Analysis of a Design Pattern for Teaching with Features and Labels", Retrieved From https://www.microsoft.com/en-us/research/wp-content/uploads/2016/11/analysis-design-pattern.pdf, Nov. 17, 2016, 11 Pages.
"International Search Report & Written Opinion Issued in PCT Application No. PCT/US2017/065939", dated Mar. 26, 2018, 18 Pages.

* cited by examiner

```
In 'Batch Train' mode, you teach using many training phrase from file, and test to find false positives.
In 'Batch Test' mode, you specify a set of predicates to test against file of positive and negative results.
In 'Test a Predicate' mode, I will just tell you what I know about the sentences you enter.
In 'Create Script' mode, you teach me which module you want to create an app for.
In 'Edit Script' mode, you edit a script you created in 'Create Script' mode (you save to a new script by changing the name).

In 'Use Script' mode you will utilize an app that was created by 'Create Script'.
Select 'Quit' after processing any given sentence (or now!) to exit.

          1. Batch Train a Predicate
          2. Batch Test a Predicate
          3. Train a Predicate from User Input
          4. Find Predicates that Match User Input
          5. Create Script
          6. Edit Script
          7. Use Script
          8. Quit
>>>1

Training with positives file
          d:\mlg\projects\SemModels\Sys\Data\trainPositivesExt,tsv
and negatives file
          d:\mlg\projects\SemModels\Sys\Data\trainNegatives.tsv

79 positives found; 417 negatives found.
No predicates found.  Please enter a name for your new predicate.
>>>Intent to buy

Here is the next positive example to suggest possible phrases to train on:
          'I'm looking to buy dawn of andromeda.'
This example itself does not yet match the predicate.
Would you like to train on this example?
Even if it matches, it may still suggest useful new patterns to learn (Y/N)?
>>>y

Ok, please enter a simple example phrase that should trigger your predicate, or 'n' if you are done entering phrases for this
predicate.
>>>I'm looking to buy dawn of Andromeda

I think that 'looking to' is a compound verb.  Is this correct (Y/N)?
>>>y

Here is the input where I've added square brackets around tokens that are part of a compound phrase (noun or verb).
          I am [looking to] buy dawn of Andromeda
If I missed any compound nouns, you may add them.  Did I miss any (Y/N)?
>>>y

Please enter the compound noun exactly as it appears in the text above, with words separated by single spaces, or enter 'n' if there
are no more compounds.
>>> dawn of Andromeda

Please teach me what "dawn of Andromeda" means by entering a word or phrase that represents the type of thing this is.
>>>video game

Can you tell me which definition "dawn of Andromeda" refers to?  If more than one fits, please just choose the best fit:
          1. [computer_game, video_game]: a game played against a computer
          2. None of the above
>>>1

Is "dawn of Andromeda" a particular instance of something, or a general concept?
          1. It's a particular instance (such as "Falcon 9" in "Falcon 9 is a rocket")
          2. It's a concept (such as "rocket" in the above)
>>>1

Here are the compound phrases I currently know about:
          I am [looking to] by [dawn of Andromeda]
Are there any other compound nouns I missed (Y/N)?
>>>n

Can you tell me which definition "looking to" refers to?  If more than one fits, please just choose the best fit:
          1. [look_to]: turn one's interests or expectations towards
             "look to the future"
             "this method looks to significant wavings"
          2. [anticipate, look_for, look_to]: be excited or anxious about
>>>2

For the definition of "looking to" you have chosen, here is a list of increasingly general meanings.  Please pick the most general
meaning that matches your intention.
          1. [anticipate, look_for, look_to]: be excited or anxious about
          2. [expect, look, await, wait]: look forward to the probable occurrence of
             "We were expecting a visit from our relatives"
             "She is looking to a promotion"
             "he is waiting to be drafted"
>>>2
In this context, is 'buy' a noun, a verb, or neither?
          1. Noun.
          2. Verb.
          3. Neither.
>>>2

Can you tell me which definition "buy" refers to?  If more than one fits, please just choose the best fit:
          1. [buy, purchase]: obtain by purchase; acquire by means of a financial transaction
             "The family purchased a new car"
             "The conglomerate acquired a new company"
             "She buys for the big department store"
```

FIG. 3

```
          2. [bribe, corrupt, buy, grease_one's_palms]: make illegal payments to in exchange for favors or influence
             "This judge can be bought"
          3. [buy]: be worth or be capable of buying
             "This sum will buy you a ride on the train"
          4. [buy]: acquire by trade or sacrifice or exchange
             "She wanted to buy his love with her dedication to him and his work"
          5. [buy]: accept as true
             "I can't buy this story"
>>>1

For the definition of "buy" you have chosen, here is a list of increasingly general meanings.  Please pick the most general meaning
that matches your intention.
          1. [buy, purchase]: obtain by purchase; acquire by means of a financial transaction
             "The family purchased a new car"
             "The conglomerate acquired a new company"
             "She buys for the big department store"
          2. [get, acquire]: come into the possession of something concrete or abstract
             "She got a lot of paintings from her uncle"
             "They acquired a new pet"
             "Get your results the next day"
             "Get permission to take a few days off from work"
>>>2

For the definition of "dawn of Andromeda" you have chosen, here is a list of increasingly general meanings.  Please pick the most
general meaning that matches your intention.
          1. [computer_game, video_game, dawn_of_andromeda]: a game played against a computer
          2. [computer_game, video_game]: a game played against a computer
          3. [game}: an amusement or pastime
             "they played word games"
             "he thought of his painting as a game that filled his empty time"
             "his life was all fun and games"
          4. [diversion, recreation]: an activity that diverts or amuses or stimulates
             "scuba diving is provided as a diversion for tourists"
             "for recreation he wrote poetry and solved crossword puzzles"
             "drug, abuse is often regarded as a form or recreation"
          5. [activity]: any specific behavior
             "they avoided all recreational activity"
          6. [act, deed, human_action, human_activity]: something that people do or cause to happen
          7. [event]: something that happens at a given place and time
          8. [psychological_feature]: a feature of the mental life of a living organism
          9. [abstraction, abstract_entity]: a general concept formed by extracting common features from specific examples
          10. [entity]: that which is perceived or known or inferred to have its own distinct existence (living or nonliving)
>>>3

Ok, I've got the following template:

          N1.  'I' as in "the speaker"
          V2.  'expect', as in "looking forward to the probable occurrence of", present or future tense
          V3.  'get', as in "come into the possession of something concrete or abstract", present or future tense
          N4.  'game', as in "an amusement of pastime"
Does this look right to you (Y/N)?
>>>y

OK, let's run it by the test set to see if it generates any false positives.
No false positives found.  Continuing.
The original positive example matches the predicate.
Would you like to enter more phrases inspired by the training example (Y/N)?

>>>I want to buy something.

I didn't find any compound phrases (noun or verb, e.g. [birthday party]) in your input.
          I want to buy something
If I missed any compound nouns, you may add them.  Did I miss any (Y/N)?
>>>n

Replace 'buy'
 With 'get', as in "come into the possession of something concrete or abstract" (Y/N)?
>>>n

In this context, is 'want' a noun, a verb, or neither?
          1. Noun.
          2. Verb.
          3. Neither.
>>>2

Can you tell me which definition "want" refers to?  If more than one fits, please just choose the best fit:
          1. [desire, want]: feel or have a desire for; want strongly
             "I want to go home now"
             "I want my own room"
          2. [want, need, require]: have need of
             "This piano wants the attention of a competent tuner"
          3. [want]: hunt or look for; want for a particular reason
             "Your former neighbor is wanted by the FBI"
             "Uncle Same wants you"
          4. [want]: wish or demand the presence of
             "I want you here at noon!"
          5. [want]: be without, lack; be deficient in
             "want courtesy"
             "want the strength to go on living"
             "flood victims wanting food and shelter"
>>>1
```

FIG. 3
(cont.)

```
In this context, is 'buy' a noun, a verb, or neither?
          1. Noun.
          2. Verb.
          3. Neither.
>>>2

Can you tell me which definition "buy" refers to?  If more than one fits, please just choose the best fit:
          1. [buy, purchase]: obtain by purchase; acquire by means of a financial transaction
             "The family purchased a new car"
             "The conglomerate acquired a new company"
             "She buys for the big department store"
          2. [bribe, corrupt, buy, grease_one's_palms]: make illegal payments to in exchange for favors or influence
             "This judge can be bought"
          3. [buy]: be worth or be capable of buying
             "This sum will buy you a ride on the train"
          4. [buy]: acquire by trade or sacrifice or exchange
             "She wanted to buy his love with her dedication to him and his work"
          5. [buy]: accept as true
             "I can't buy this story"
>>>1

For the definition of "buy" you have chosen, here is a list of increasingly general meanings.  Please pick the most general meaning
that matches your intention.
          1. [buy, purchase]: obtain by purchase; acquire by means of a financial transaction
             "The family purchased a new car"
             The conglomerate acquired a new company"
             "She buys for the big department store"
          2. [get, acquire]: come into the possession of something concrete or abstract
             "She got a lot of paintings from her uncle"
             "They acquired a new pet"
             "Get your results the next day"
             "Get permission to take a few days off from work"
>>>1

OK, I've got the following template:
          N1. 'I', as in "the speaker"
          V2. 'desire', as in "feel or have a desire for; want strongly", present or future tense
          V3. 'buy', as in "obtain by purchase; acquire by means of a financial transaction", present or future tense
          N4. 'artifact', as in " a man-made object taken as a while"

Does this look right to you (Y/N)?

>>>y

OK, let's run it by the test set to see if it generates any false positives.
No false positives found.  Continuing.
Would you like to enter more phrases inspired by the training example (Y/N)?
```

FIG. 3
(cont.)

```
In 'Batch Test' mode, you specify a set of predicates to test against file of positive and negative results.
In 'Train a Predicate' mode, you teach me how to recognize a type of task, event or relation that you'd like to model.
In 'Test a Predicate' mode, I will just tell you what I know about the sentences you enter.
In 'Create Script' mode, you will utilize an app that was created by 'Create Script'.
Select 'Quit' after processing any given sentence (or now!) to quite.

        1. Batch Train a Predicate
        2. Batch Test a Predicate
        3. Train a Predicate from User Input
        4. Find Predicates that Match User Input
        5. Create Script
        6. Use Script
        7. Quit
>>>5

Here are all the modules that I know.  Please select which module you want to use.
        1. Event Reminder Module
        2. Quit
>>>1

Let's create your application.  Throughout, I will use a running example of a "feed the Fish" imaginary application.
Please name your new application script (e.g. "Feed the Fish")
>>>Medications Tracker

The name of the application script is "medications Tracker".  Is that correct (Y/N)?
>>>y

Please give a short description of this reminder app, for example, "set reminders to …" where you fill in the blank.  This should be
distinct from descriptions for other reminder applications, as it will be shown to the user in a list of possible apps they can
select.
>>>Set reminders to take medications

The description of the application script is "Set reminder to take medications".  Is this correct (Y/N)?
>>>y

I need to know how to refer to the type of reminders created by your app.  If I tell the user, "I understand that you'd like me to
help remind you when to X", what would be a good phrase for X?  Please be sure that:
        1. X starts with a verb (because it is an action, and will be inserted as a verb phrase into many sentences to request
           input and confirmation from the user).
        2. X refers to the type of reminder rather than a specific instance of the reminder; for example, "feed the fish", but not
           "feed the fish once a day".
Please enter a phrase for X.
>>>take your medications
I understand that you'd like me to replace X above with "take your medications".  Is that correct (Y.N)?
>>> y

I will confirm with the user that they want to create a reminder with this application by asking "Do you want to create a schedule of
reminders to take your medications?".  Is that correct (Y/N)?
>>>y

When the user wants to run an app, they will type a phrase that describes what they want to do, and I will find apps that match that
intent.  So, you need to teach me how to recognize when the user wants to run your app, by entering example phrases That the user
might type to do this; for example, "feed the fish" to create a fish-feeding reminder.
I will try to generalize your examples, so that you don't have to type in too many.
I will use what you tell me to build a "predicate", which describes the meaning I will look for in the user's text.

Please enter a new example sentence, or 'n' to stop adding sentences:
>>>take meds

I didn't find any compound phrases (noun or verb, e.g. [birthday party]) in your input.
        Take medications
If I missed any compound nouns, you may add them.  Did I miss any (Y/N)?
>>>n

In this context is 'take' a noun, a verb, or neither?
        1. Noun.
        2. Verb.
        3. Neither.
>>>2

Can you tell me which definition "take" refers to?  If more than one fits, please just choose the best fit;
        1. [take]: carry out
           "take action"
           "take steps"
           "Take vengeance"
        2. [take, occupy, use_up]: require (time or space)
           "It took three hours to get to work this morning"
           "This event occupied a very short time"
        3. [lead, take, direct, conduct, guide]: take somebody somewhere
           "We lead him to our chief"
           "can you take me to the main entrance?"
           "He conducted us to the palace"
        4. [take, get_hold_of]: get into one's hands, take physically
           "take a cookie!"
           "Can you take this bag, please"
        5. [assume, acquire, adopt, take_on, take]: take on a certain form, attribute, or aspect
           "His voice took on a sad tone"
           "The story took a new turn"
           "he adopted an air of superiority"
           "She assumed strange manners"
           "The gods assume human or animal from in these fables"
        6. [take, read]: interpret something in a certain way; convey a particular meaning or impression
           "I read this address as a satire"
           "How should I take this message?"
```

FIG. 4

7. [bring, convey, take]: take something or somebody with oneself somewhere
"Bring me the box from the other room"
"Take these letters to the boss"
"This brings me to the main point"
8. [take]: take into one's possession
"We are taking an orphan from Romania"
"I'll take three salmon steaks"
9. [take]: travel or go by means of a certain kind of transportation, or a certain route
"He takes the bus to work"
"She takes Route 1 to Newark"
10. [choose, take, select, pick_out]: pick out, select, or choose from a number of alternatives
"take any one of these cards"
"Choose a good husband for your daughter"
"She selected a pair of shoes from among the dozen the salesgirl had shown her"
11. [accept, take, have]: receive willingly something given or offered
"The only girl who would have him was the miller's daughter"
"I won't have this dog in my house!"
"Please accept my present"
12. [fill, take, occupy]: assume, as of positions or roles
"She took the job as director of development"
"he occupies the position of manager"
"the young prince will soon occupy the throne"
13. [consider, take, deal, look_at]: take into consideration for exemplifying purposes
"Take the case of China"
"Consider the following case"
14. [necessitate, ask, postulate, need, require, take, involve, call_for, demand}: require as useful, just, or proper
"It takes nerve to do what she did"
"success usually requires hard work"
"This job asks a lot of patience and skill"
"This position demands a lot of personal sacrifice"
"This dinner calls for a spectacular dessert"
"This intervention does not postulate a patient's consent"
15. [take]: experience or feel or submit to
"Take a test"
"Take the Plunge"
16. [film, shoot, take]: make a film or photograph of something
"take a scene"
"shoot a movie"
17. [remove, take, take_away, withdraw]: remove something concrete, as by lifting, pushing, or taking off, or remove something abstract
"remove a threat"
"remove a wrapper"
"Remove the dirty dishes from the table"
"take the gun from your pocket"
"This machine withdraws heat from the environment"
18. [consume, ingest, take_in, take, have]: serve oneself to, or consume regularly
"Have another bowl of chicken soup!"
"I don't take sugar in my coffee"
19. [take, submit]: accept or undergo, often unwillingly
"We took a pay cut"
20. [take, accept]: make user of or accept for some purpose
"take a risk"
"take an opportunity"
21. [take]: take by force
"Hitler took the Baltic Republics"
"The army took the fort of the hill"
22. [assume, take, strike, take_up]: occupy or take on
"He assumes the lotus position"
"She took her seat on the state"
"We took our seats in the orchestra"
"She took up her position behind the tree"
"strike a pose"
23. [accept, admit, take, take_on]: admit into a group or community
"accept students for graduate study"
"We'll have to vote on whether or not to admit a new member"
24. [take]: ascertain or determine by measuring, computing or take a reading from a dial
"take a pulse"
"A reading was taken of the earth's tremors"
25. [learn, study, read, take]: be a student of a certain subject
"She is reading for the bar exam"
26. [claim, take, exact]: take as an undesirable consequence of some event or state of affairs
"the accident claimed three lives"
"The hard work took its toll on her"
27. [take, make]: head into a specified direction
"The escaped convict took to the hills"
"We made for the mountains"
28. [aim, take, train, take_aim, direct]: point or cause to go (blows, weapons, or objects such as photographic equipment) towards
"Please don't aim at your little brother!"
"He trained his gun on the burglar"
"Don't train your camera on the women"
"Take a swipe at one's opponent"
29. [take]: be seized or affected in a specified way
"take sick"
"be taken drunk"
30. [carry, pack ,take]: have with oneself; have on one's person
"She always takes an umbrella"
"I always carry money"
"She packs a gun when she goes into the mountains"
31. [lease, rent, hire, charter, engage, take]: engage for service under a term of contract
"We took an apartment on a quiet street"
"Let's rent a car"
"Shall we take a guide in Rome?"
32. [subscribe, subscribe_to, take]: receive or obtain regularly
"We take the Times every day"

FIG. 4
(cont.)

```
          33. [take]:buy, select
              "I'll take a pound of that sausage"
          34. [take]: to get into a position of having, e.g., safely, comfort
              "take shelter from the storm"
          35. [take, have]: have sex with; archaic use
              "He had taken this woman when she was most vulnerable"
          36. [claim, take]: lay claim to; as of an idea
              "She took credit for the whole idea"
          37. [accept, take]: be designed to hold or take
              "This surface will not take the dye"
          38. [contain, take, hold]: be capable of holding or containing
              "This box won't take all the items"
              "The flask holds one gallon"
          39. [take]: develop a habit
              "He took to visiting bars"
          40. [drive, take]: proceed along in a vehicle
              "We drive the turnpike to work"
          41. [take]: obtain by winning
              "Winner takes all"
              "He took first prize"
          42. [contract, take, get]: be stricken by an illness, fall victim to an illness
              "He got AIDS"
              "She came down with pneumonia"
              "She took a chill"
>>>18

Can you tell me which definition "medications" refers to?  If more than one fits, please just choose the best fit:
          1. [medicine, medication, medicament, medicinal_drug]: (medicine) something that treats or prevents or alleviates the
             symptoms of disease
          2. [medication]: the act of treating with medicines or remedies
>>>1

For the definition of "medications" you have chosen, here is a list of increasingly general meanings.  Please pick the most general
meaning that matches your intention.
          1. [medicine, medication, medicament, medicinal_drug]: (medicine) something that treats or prevents or alleviatesthe
             symptoms of disease
          2. [drug]: a substance that is used as a medicine or narcotic
          3. [agent]: a substance that exerts some force or effect
          4. [substance]: a particular kind or species of matter with uniform properties "shigalla is one of the most toxic
             substances known to man"
          5. [causal_agent, cause, causal_agency]: any entity that produces an effect or is responsible for events or results
          6. [matter]: that which has mass and occupies space "physicists study both the nature of matter and the forces which govern
             it"
          7. [physical_entity]: an entity that has physical existence
          8. [entity]: that which is perceived or known or inferred to have its own distinct existence (living or nonliving)
>>>2

OK, I'm adding the following pattern to my database:

          'consume', as in "serve oneself to, or consume regularly", present or future tense
          'drug', as in "a substance that is used as a medicine or narcotic"

Do you want to continue training predicates using another sentence (Y/N)?
>>>y

Please enter a new example sentence, or 'n' to stop adding sentences:
>>>remind me to take my meds

I didn't find any compound phrases (noun or verb, e.g. [birthday party]) in your input.
          Remind me to take my medications
If I missed any compound nouns, you may add them.  Did I miss any (Y/N)?
>>>n

Replace 'take' with 'consume', as in "serve oneself to, or consume regularly" (Y/N)?
>>>y

Replace 'medications' with 'drug', as in " a substance that is used as a medicine or narcotic" (Y/N)?
>>>y

This phrase already matches your predicate:
          Predicate name: take your medications
Component names: []
Let's continue - please enter another phrase:
Do you want to continue training predicates using another sentence (Y/N)?
>>>n

OK, we've finished teaching the system how to recognize when the user wants to run your app.
Now we'll teach your app how to guide the user in creating their reminder.

I will ask the user to provide a name for their new reminder by saying "What would you like to name this particular reminder?".  Does
that sound good (Y/N)?
>>>y

I will ask the user to provide some optional notes for their reminder by saying "Please enter some notes for this reminder, or leave
it empty."  Does that sound good (Y/N)?
>>>y

I need to know how to ask the user to enter a sentence that describes the reminder schedule.  You can customize this request to use
terms specific to the application; for example, a medication reminder application might ask "Please carefully read me the instructions
written on your prescription".  If the use enters all necessary information (except for constant default values that you can define in
the next steps), they will be able to confirm the schedule with a single sentence, so ask them to enter as much information as they
can.
          1. By default I will ask the user a generic question requesting all elements of the schedule - start date, time, period,
             and the durations of the event and of the reminder recurrence.  You can customize this to ask for only the elements that
             you will not define constant values for.
```

FIG. 4
(cont.)

2. I will also add
"You will be prompted for any missing elements that are needed, and you may enter multiple reminders separated by the word 'then'"

(for example, "feed twice daily for a week, then once daily" would be two reminders).

So to confirm, I will ask the user to enter one sentence that describes the reminder schedule by saying, "Please enter a sentence that describes the reminder schedule as fully as possible, including:
1. The start date, e.g. Nov 12" or "next Monday".
2. The recurrence rate (the period used for grouping reminders), e.g. "daily" or "twice a day".
3. The time of day you'd like to be reminder, e.g. "10am"
4. The event duration (how long each event will take), e.g. "one hour".
5. The sequence duration (how long you'd like these reminders to appear on your calendar, e.g. "one year"."

Please type "Y" to confirm that this is what you want, or "N" to input a different sentence (Y/N)?
>>>n OK, then please enter the sentence you would like to use here.
>>>Please carefully read me the instructions written on your prescription So to confirm, I will ask the user to enter one sentence that describes the reminder schedule by saying,
"Please carefully read me the instructions written on your prescription"
Please type "Y" to confirm that this is what you want, or "N" to input a different sentence (Y/N)
>>>y I will ask the user how long the reminder schedule should remain in their calendar, or you may specify a constant value to be used.
Please pick an option:
1. Ask the user: "Please tell me the span of time over which you'd like me to keep issuing your reminders, for example, '10 days', 'one month', 'a year', or 'forever'.".
2. Specify a different question to ask the use. This can reflect your specific app, for example "How long will you continue to feed the fish?"
3. Do not ask the user; instead, specify a constant value. For example, a single appointment with no recurrence might specify "one hour" as the schedule duration.

>>>1

You would like me to ask the user "Please tell me the span of time over which you'd like me to keep issuing your reminders, for example, '10 days', 'one month', 'a year', or 'forever'.".
Is that correct (Y/N)?
>>>y I will ask the user for the period used for grouping their reminders, or you may specify a constant value to be used.
Please pick an option:
1. Ask the user: "Please tell me the period of time over which your reminders are grouped. For example, in the reminder to "feed the fish once daily", the period is "daily".".
2. Specify a different question to ask the user. This can reflect your specific app, for example "How often will you feed the fish?"
3. Do not ask the user; instead, specify a constant value. For example, a birthday reminder would specify "yearly" as the constant period.

>>>1

You would like me to ask the user "Please tell me the period of time over which your reminders are grouped. For example, in the reminder to "feed the fish once daily", the period is "daily".".
Is that correct (Y/N)?
>>>y I will ask the user how much time each individual event will take, or you may specify a constant value to be used.
Please pick an option:
1. Ask the user: "Please tell me how much time is required each time you take your medications.".
2. Specify a different question to ask the user. This can reflect your specific app, for example "How long will it take you to feed the fish?"
3. Do not ask the user; instead, specify a constant value. For example, a reminder to take a pill might specify "5 minutes" as the amount of time the event will take.

>>>3

Please enter the constant value you would like to use here. Enter 'Retry' to return to the list of options.
>>>5 minutes You would like to specify that each event will take a constant time of 5 minutes. Is that correct (Y/N)?
>>>y I will ask the user how many reminders there are in each period, or you may specify a constant value to be used.
Please pick an option:
1. Ask the user: "Please tell me how often you will take your medications per <reminder period>.".
2. Specify a different questions to ask the user. This can reflect your specific app, for example "How many times per <reminder period> will you feed the fish?"
3. Do not ask the user; instead, specify a constant value. For example, a birthday reminder would specify "once" as the constant number of events.

>>>1

You would like me to ask the user "Please tell me how often you will take your medications per <reminder period>.".
Is that correct (Y/N)?
>>>y I will ask the user for the start date for their reminders by saying "what day would you like your reminders to take your medications to begin?"? Does that sound good (Y/N)?
>>>y I will ask the user when each individual reminder would occur by saying "For each <reminder period>, what time of day would you like <your first, second, etc.> reminder to take your medications?
Please state this in the form e.g. '10:15 a.m.'."
Does that sound good (Y/N)?
>>>y Thank you, we are done creating the "Medications Tracker" script!

Here are all the modules that I know. Please select which module you want to use.
1. Event Reminder Module
2. Quit

END

FIG. 4 (cont.)

```
NEW
Hello please start by choosing the mode you'd like to work in.
In 'Batch Train' mode, you teach using many training phrase from file, and test to find false positives
In 'Batch test' mode, you specify a set of predicates to test against file of positive and negative results
In 'Train a Predicate' mode, you teach me how to recognize a type of task, event or relation that you'd like to model.
In 'Test a Predicate' mode, I will just tell you what I know about the sentences you enter.
In 'Create Script' mode, you te4ach me which module you want to create an app for.
In 'Use Script' mode, you will utilize an app that was created by 'Create Script'.
Select 'quit' after processing any given sentence (or now!) to quit.
           1. Batch Train a Predicate
           2. Batch Test a Predicate
           3. Train a Predicate from User input
           4. D Predicates that Match User Input
           5. Create Script
           6. Use Script
           7. Quit
>>>6

I'm going to help you create a reminder.
Please enter an activity description and I'll look for matching scripts, or type ctrl-c to exit.
>>>take meds

Do you want to create a schedule of reminders to take your medications (Y/N)?
>>>y

Please carefully read me the instructions written on your prescription
You will be prompted for any missing elements that are needed, and you may enter multiple reminders separated by the word 'then'.
>>> Take 1 drop twice daily

I've found one reminder in your description:
           1. Take 1 drop twice daily
Is that correct (Y/N)?
>>>y

Let's confirm your reminder.  The text of this reminder is "Take 1 drop twice daily".

What would you like to name this particular reminder?
>>>Micellized Vitamin D3

Your name for the event is "Micellized Vitamin D3".  Is that correct (Y/N)?
>>>y

Your notes for the vent are "Take 1 drop twice daily".  Is that correct (Y/N)?
>>>y

Please tell me the span of time over which you'd like me to keep issuing your reminders, for example, '10 days', 'one month', 'a
year', or 'forever'.
>>>Two months

You would like your reminders to take your medications to be delivered for 61 days.  Is that correct (Y/N)?
>>>y

You would like to take your medications on a per 1 day basis.  Is that correct (Y/N)?
>>>y

You would like to take your medications 2 time(s) every 1 day.  Is that correct (Y/N)?
>>>y

What day would you like your reminders to take your medication to begin?
>>>now

You would like to start on October 15, 2016.  Is that correct (Y/N)?
>>>y

You have specified 2 reminders per 1 day

For each <reminder period>, what time of day would you like <your first, second, etc.> reminder to take your medications?
Please state this in the form e.g. '10:15 a.m.'.
>>>8am

You would like a reminder at 8:00 AM every 1 day.  Is that correct (Y/N)?
>>>y

You have specified 2 reminders per 1 day.

For each <reminder period>, what time of day would you like <your first, second, etc.> reminder to take your medications?
Please state this in the form e.g. '10:15 a.m.'.
>>>12 noon

You would like a reminder at 12:00 PM every 1 day.  Is that correct (Y/N)?
>>>y

Thank you, we are done creating the reminder to take your medications 2 time(s) for 5 minutes every 1 day over 61 days.  Your first
reminder is set at 8:00 AM on October 15, 2016.
App event save to d:\mlg\projects\SemModels\Sys\Apps\Medications Tracker\Events\2016-10-15@12-35-54.config.yaml

Would you like to create another reminder?
Please enter an activity description and I'll look for matching scripts, or type Ctrl-C to exit.
>>>medications
```

FIG. 5

```
Here are all available activity descriptions.  Please select the action you would like to create a reminder for, or type Ctrl-C to
exit.
           1. Remember birthdays
           2. Motivation to get a workout in
           3. Set reminders to take medications
           4. Retry
>>>3

Do you want to create a schedule of reminders to take your medications (Y/N)?
>>>y

Please carefully read me the instructions written on your prescription
You will be prompted for any missing elements that are needed, and you may enter multiple reminders separated by the word 'then'.
>>>One or two pastilles (200,000-40,00 unites) dissolved slowly in mouth 4-5 times daily for 10-14 days

I've found one reminder in your description:
           1. One or two pastilles (200,00-40,00 unites) dissolved slowly in mouth 4-5 times daily for 10-14 days
Is that correct (Y/N)?
>>>Y

Lets confirm your reminder.  The text of this reminder is "One or two pastilles (200,000-40,00 units) dissolved slowly in mouth 4-5
times daily for 10-14 days".

What would you like to name this particular reminder?
>>>Clotrimazole

Your name for the event is "Clotrimazole".  Is that correct (Y/N)?
>>>y

Your notes for the event are "One or two pastilles (200,00 - 40,00 unites) dissolved slowly in mouth 4-5 times daily for 10-14 days".
Is that correct (Y/N)?
>>>y

We need a specific period between "10 days" and"14 days".  Please tell me the span of time over which you'd like me to keep issuing
your reminders, for example, '10 days', 'one month', 'a year', or 'forever'.
>>>14 days

You would like your reminder to take your medications to be delivered for 14 days.  Is that correct (Y/N)?
>>>y

You would like to take your medications on a per 1 day basis.  Is that correct (Y/N)?
>>>y

We need a specific number between 4.000000 and 5.000000.  Please tell me how often you will take your medications per <reminder
period>.
>>>5

You would like to take your medications 5 time(s) every 1 day.  Is that correct (Y/N)?
>>>y

What day would you like your reminders to take your medications to begin?
>>>today

You would like to start on October 15, 2016.  Is that correct (Y/N)?
>>>y

You have specified 5 reminders per 1 day.

For each <reminder period>, what time of day would you like <your first, second, etc.> reminder to take your medications?
Please state this in the form e.g. '10:15' a.m.'.
>>>8:15 am

You would like a reminder at 8:15 AM every 1 day.  Is that correct (Y/N)?
>>>Y

You have specified 5 reminders per 1 day.

For each <reminder period>, what time of day would you like <your first, second, etc.> reminder to take your medications?
Please state this in the form e.g. '10:15 a.m.'.
>>>8:15 am

You would like a reminder at 8:15 AM every 1 day.  Is that correct (Y/N)?
>>>y

You have specified 5 reminders per 1 day.

For each <reminder period>, what time of day would you like <your first, second, etc.> reminder to take your medications?
Please state this in the form e.g. '10:15 a.m.'.
>>>10 am

You would like a reminder at 10:00 AM every 1 day.  Is that correct (Y/N)?
>>>y

You have specified 5 reminders per 1 day.

For each <reminder period>, what time of day would you like <your first, second, etc.> reminder to take your medications?
Please state this in the form e.g. '10:15 a.m.'.
>>>12 noon

You world like a reminder at 12:00 PM every 1 day.  Is that correct (Y/N)?
>>>y

You have specified 5 reminders per 1 day.
```

FIG. 5
(cont.)

```
For each <reminder period>, what time of day would you like <your first, second, etc.> reminder to take your medications?
Please state this in the form e.g. '10:15 a.m.'.
>>>2 pm

You would like a reminder at 2:00 PM every 1 day.  Is that correct (Y/N)?
>>>y

You have specified 5 reminders per 1 day.

For each <reminder period>, what time of day would you like <your first, second, etc.> reminder to take your medications?
Please state this in the form e.g. '10:15 a.m.'.
>>>4 pm

You would like a reminder at 4:00 PM every 1 day.  Is that correct (Y/N)?
>>>y

Thank you, we are done creating the reminder to take your medications 5 time(s) for 5 minutes every 1 day over 14 days.  Your first
reminder is set at 8:15 AM on October 15, 2016.
App event save to d:\mlg\projects\SemModels\Sys\Apps\Medicaitons tracker\Events\2016-10-15@12-39-39.config.yaml

Would you like to create another reminder?
Please enter an activity description and I'll look for matching scripts, or type Ctrl-C to exit.
>>>
```

FIG. 5
(cont.)

FACILITATING APPLICATION DEVELOPMENT

BACKGROUND

Automated Personal Assistants (APAs) can perform various tasks through conversational dialogs with users. For example, an automated personal assistant can detect when a user desires to place a phone call, find an address, or add an item to a calendar and, thereafter, perform such a desired action. Typically, to generate new tasks or applications, developers must write a new design, make modifications to the implementation, and undergo various stages of software testing. Further, for tasks or applications using dialogue, a turn-taking structure of the dialog, additional underlying logic, and/or language instruction (e.g., to accomplish language recognition) may be needed. As such, in addition to application development being time consuming, an understanding of application development is typically needed to generate new tasks or applications thereby restricting the scalability of application development.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating application development. In particular, utilizing aspects described herein, application development can be performed by non-experts in an efficient manner. In effect, crowd sourcing for application development enables applications to be generated in a more scalable manner. Further, for applications using dialog, the language instruction component of application development can also be performed via individuals that are not software development experts (i.e., non-experts).

BRIEF DESCRIPTION OF THE DRAWINGS

The technology described herein is described in detail below with reference to the attached drawing figures, wherein:

FIG. 3 is an exemplary command-line interface for providing an interactive visualization of training a predicate in accordance with aspects of the technology described herein;

FIG. 4 is an exemplary command-line interface for providing an interactive visualization of creating an application in accordance with aspects of the technology described herein;

FIG. 5 is an exemplary command-line interface for providing an interactive visualization of using an application in accordance with aspects of the technology described herein;

DETAILED DESCRIPTION

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, facilitating application development. In particular, utilizing aspects described herein, application development can be performed by non-experts in an efficient manner. In effect, utilizing non-experts for application development enables applications to be generated in a more scalable manner. Further, for applications using dialog, the language instruction component of application development can also be performed via individuals that are not software development experts (i.e., non-experts).

In implementation, and at a high level, a designer can provide designer input used to generate a module specification associated with a class of applications. Such a module specification can then be used to create any number of applications associated with that particular class of applications. In this regard, a set of teachers can access the module specification and use the module specification to generate various specific applications related to the class of applications. In one aspect, a teacher can train the system to identify application user intent to recognize intent of users to utilize the application, among other things. Such developed applications can then be used to perform various functionalities. In accordance with some embodiments described herein, the applications can perform functionality via an agent, such as an automated personal assistant.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 1:
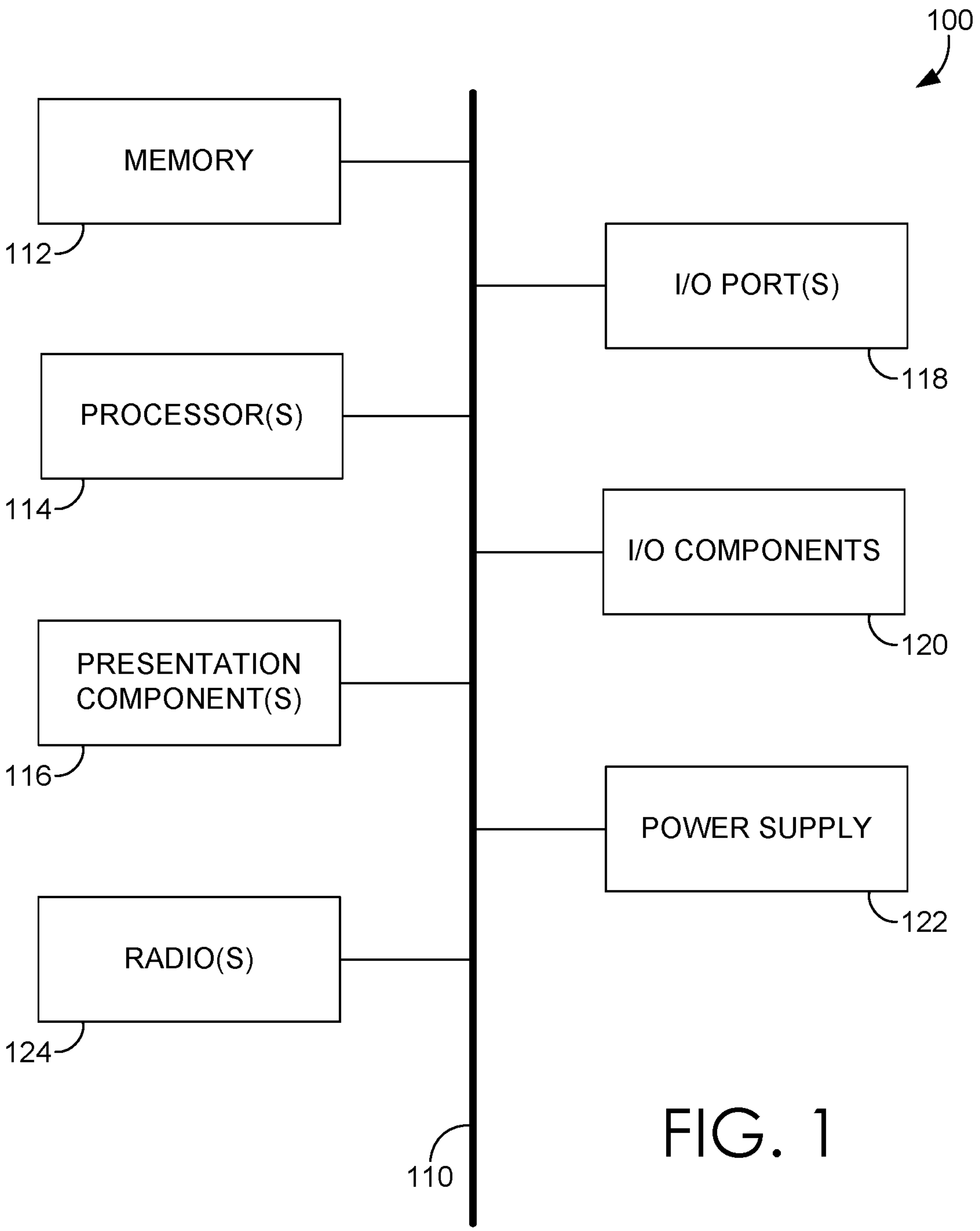
FIG. 1 is a block diagram of an exemplary computing environment suitable for use in implementing aspects of the technology described herein.

Referring to the drawings in general, and initially to FIG. 1 in particular, an exemplary operating environment for implementing aspects of the technology described herein is shown and designated generally as computing device 100. Computing device 100 is just one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, and a radio(s) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O port(s) 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include radio(s) 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to “short” and “long” types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Overview of an Exemplary Environment for Facilitating Application Development

Figure 2:
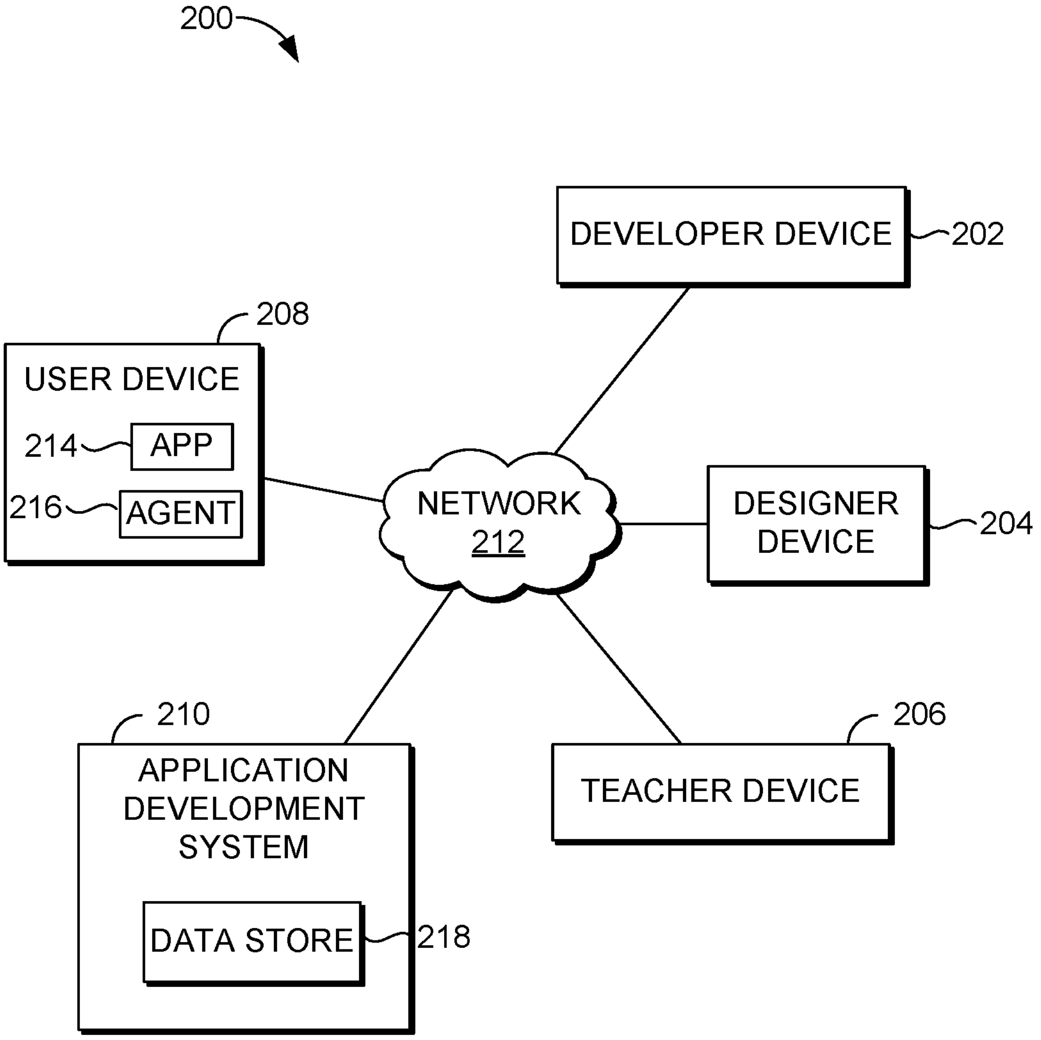
FIG. 2 is a block diagram of an exemplary system for facilitating application development, suitable for use in implementing aspects of the technology described herein.

Referring now to FIG. 2, a block diagram of an exemplary network environment 200 suitable for use in implementing embodiments of the invention is shown. Generally, the system 200 illustrates an environment suitable for facilitating application development. The network environment 200 includes a developer device 202, a designer device 204, a teacher device 206, a user device 208, and an application development system 210. The developer device 202, the designer device 204, the teacher device 206, the user device 208, and the application development system 210 can communicate through a network 212, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, although the environment 200 is illustrated with a network, one or more of the components may directly communicate with one another, for example, via HDMI (high-definition multimedia interface), DVI (digital visual interface), etc.

Each of the developer device 202, the designer device 204, the teacher device 206, the user device 208, and the application development system 210 can be any kind of computing device capable of facilitating application development. For example, in an embodiment, the devices 202, 204, 206, 208, and/or 210 can be a computing device such as computing device 100, as described above with reference to FIG. 1. In embodiments, such devices can be a personal computer (PC), a laptop computer, a workstation, a mobile computing device, a PDA, a cell phone, a server, a cluster of servers, or the like. The devices can include one or more processors, and one or more computer-readable media. The computer-readable media may include computer-readable instructions executable by the one or more processors.

As described, the network environment 200 is configured to facilitate application development such that application development can be performed in an efficient and scalable manner. To this end, application development can be accomplished by individuals that are not experts in application development and/or language instruction (i.e., development and comprehension of a language). In particular, and as described more fully below, one designer can create a script that can be used by numerous teachers (e.g., hundreds), who then in turn create applications used by an extensive number (e.g., millions) of users. Although various embodiments of the present invention describe applications or tasks (applications and tasks may be used interchangeably herein) being developed in association with or for utilization by automated personal assistants (APAs), the scope of the invention is not intended to be limited thereto. In this regard, applications, or tasks, may be developed as described herein for use in a non-APA environment. Further, while various embodiments described herein refer to applications or tasks being generated in a manner that enables conversational dialog, the scope of the invention is not intended to be limited thereto.

User device 210 can be any type of computing device capable of running an application, such as application 214. As illustrated, the user device 210 includes application 214. The application 214 can be any type of application or task that can perform any type of function. In embodiments, the application 214 may be a task performed in operation with an automated personal assistant. As described in more detail below, application 214 represents an application developed in accordance with embodiments of the present invention. In embodiments, the application 214 may be a dedicated application, a stand-alone application, a mobile application, or the like. In addition or instead, application 214 may be incorporated, or integrated, into another application or operating system, or an add-on or plug-in to another application, such as agent 216.

The agent 216 may generally be any application capable of performing a function(s) using application 214. Such an agent may be an intelligent agent, an autonomous agent, a distributed agent, a mobile agent, or the like. In some implementations, agent 216 is an automated personal assistant (APA) sometimes referred to as an intelligent personal assistant. An automated personal assistant can perform tasks, or services, utilizing user input, location awareness, and/or other accessed data (e.g., via remote or local sources). For example, an automated personal assistant may access data such as weather conditions, traffic congestion, news, stock prices, user schedules, product prices, etc. to perform a task or set of tasks. Some automated personalassistants perform tasks in accordance with user interaction, while other automated personal assistances handle tasks without user interaction (e.g., by accessing data). Although agent 216 is generally referred to as an automated personal assistant, in accordance with embodiments described herein, agent 216 may be any type of application and is not intended to be limited in scope.

The application development system 210 is generally configured to facilitate application development. As described herein, the application development system 210 can communicate with various components, such as developer device 202, designer device 204, teacher device 206, and user device 208. Although illustrated as a single component, as can be appreciated, application development system 210 can be any number of components or devices, for example, a cluster of servers operating in connection with one another. Further, as can be appreciated, any number of functionalities described herein can be performed in association with another component or device (e.g., developer device, designer device, and teacher device).

Generally, the application development system 210 facilitates generation of applications. In particular, the application development system 210 can communicate with the developer device, designer device, and teacher device to generate an application. A developed application can be stored, for example, at the data store 218. The application can be provided to the user device 208. By way of example, in some embodiments, the application 214 may be pushed to the user device 208 as an agent 216 update. In other embodiments, a user of the user device 208 may request to download or install an application, resulting in application 214 being provided to the user device 208.

In operation, scalable application development may be initiated via the developer device 202 and/or designer device 204. The developer device 202 can be any computing device that can be operated by a developer to facilitate application development. In embodiments, a developer device 202 is generally used to develop and/or support agent 216. In this regard, a developer may write code via the developer device 202 (or other device) such that the agent 216 performs functions in association with the application 214. By way of example only, assume that agent 216 is an automated personal assistant and application 214 is a reminder application to facilitate providing reminders to users. In such a case, the developer can create code for the agent 216 to add an event to a user's calendar upon detection of an indication to generate a reminder. In some cases, the developer can identify or provide, via developer device 202, classes of applications such that the agent 216 response for any application in a given class need only be coded once.

In some embodiments, the developer device 202 may generate predicates, such as built-in predicates. A predicate is generally a function that returns a true or false value. To this end, a predicate can be a Boolean function over text, where the function has "state." Such a state can be modeled with a data structure that determines an event (what happens) when the predicate is true. A data structure can contain slots that are populated when the predicate returns a true value ("fires"). For example, a predicate for "is collocated with" might contain a slot for a set of entities that are deemed to be collocated, whenever the predicate returns a true value. A data structure can also include a handler function(s) that indicates, for example, to an agent, an event when the predicate returns a true value.

In accordance with embodiments described herein, predicates may be a learned predicate or a built-in (or parsed) predicate. A built-in predicate refers to a predicate that can be used on a more global basis, that is, across classes of applications. Accordingly, built-in predicates can be used by any number of designers in creating different classes of applications. Built-in predicates can correspond with various types of data, such as time, frequency, period, and duration. By way of example only, a developer might create built-in predicates for time, frequency, period, and duration for use with an event reminder class of applications. Such built-in predicates can then be used by other designers in their creation of a different class of applications. Although built-in predicates are generally described herein as being hard-coded into the system, for example, by a developer, as can be appreciated, built-in predicates may additionally or alternatively be taught (e.g., in a manner the same or similar as described herein with respect to learned predicates). A learned predicate generally refers to a predicate that is learned, for example, from a teacher(s), which is described in more detail below.

The designer device 204 is generally configured to facilitate designing classes of applications. The designer device 204 can be any computing device that can be operated by a designer to facilitate application development. A designer generally refers to an individual or entity that supports or facilitates design enabling a teacher to create an application. In embodiments, to extend agents, such as automated personal assistants, to support a new application domain, a designer can create a module specification that supports the new class of applications. To do so, a designer typically identifies a class of applications (tasks) desired for agents, such as agent 216, to support or handle. By way of example only, a designer may specify a class of applications as applications pertaining to intent to set reminders, intent to purchase, etc.

Additionally, a designer can design a module specification for application domains within a given class. In this regard, a designer can specify how a teacher will create an application from the designer's designated class of applications. A module specification refers to a specification to use to enable generation of an application. As can be appreciated, a designer may not need the requisite level of understanding for software development. Instead, a designer may have an understanding of a scripting language to provide a module specification that can be used by a teacher(s) to create an application. In embodiments, a designer may generate a module specification using a specification language, referred to herein as a module specification language. A module specification language can refer to a single language that is shared by all designers. In this regard, each designer can write a module specification in the module specification language.

Accordingly, a designer can interact with designer device 204 to input data, such as an identification of a class of applications and/or aspects of a module specification. A class indicator to identify or indicate a class of applications and/or module specification can be input to designer device 204 in any number of manners. For example, a class of applications may be input by the user or selected from among a plurality of class options. A class of applications refers to a type or category of applications. As such, applications within a class of applications are generally related in some manner. As a further example, aspects of a module specification can be entered or selected from among a plurality of specification components. Specification components refer to components or portions of a module specification. Specification components may include statements, questions, syntax, combinations thereof, or the like.

A module specification may perform various functions, as delineated via blocks, sections, or portions. As such, designer input can be related to any such functions or blocks. Example blocks include a name block, an initialize block, a teach block, and a use block. A name block refers to a string that defines the name of the module representing a class of applications. For example, a name may be "Event Reminders" to represent a class of applications related to providing reminders of various events. As can be appreciated, the natural sequential nature of a module specification can enable creation of variables early in the script that can be used throughout the specification, for example, in all blocks.

An initialize block refers to a set of application-independent constants that can be used to streamline the interactions with a teacher. By way of example, the "Event Reminders" module defines the <OKEnterSentence> string constant to have the value "OK, then please enter the sentence you would like me to use here." Such a string constant can be used any number of times in the module specification. The initialize block can also be used to ask a teacher any questions needed to acquire metadata about the application.

The teach block can include various turn types, such as predicate detecting turns, and parameter value turns. At a high level, the teach block is a turn-taking structure, where the designer designs a series of questions intended to leverage the teacher's language skills to teach the application the language comprehension and generation skills that are to be used in user mode. To this end, the designer is designing a manner in which to elicit information from a teacher for use in developing an application. By way of example only, in the "Events Reminder" example, a predicate turn is used to elicit from the teacher sentences that exemplify the language that the user is likely to input in order to identify this application from the pool of applications available to the user. This lets the agent know which application the user wants to run. In the parameter value turns, the teacher specifies, for example, the language used to elicit a name for the series of reminders that the user is creating. The designer can also elicit from the teacher any language that is likely to be repeated. For instance, the designer may want to extract a general verb phrase from the teacher to refer to the type of reminders created by the application (e.g., "take your medications" for a medication reminder application). Such a verb phrase can then be referred to throughout the remainder of the module specification (e.g., via both teach and use blocks).

The use block is generally a turn-taking structure that obtains and parses input to create an actual entity or event. By way of example only, in the Events Reminder example, a predicate detecting turn is used to parse user input describing their reminders, and parameter value turns are then used to confirm the values found, or to ask the user to fill in missing values (such as the length of time for which the reminders should run). Thus, for an individual reminder, a single predicate detecting turn may receive a sentence from the user that contains all the information needed to create the reminder. The information can then be confirmed in a single turn. If the user chooses to change some of this information, or if some necessary information is missing, further parameter value turns can be run to gather the needed data.

Depending on a type of information to be gathered or delivered, various turn types can be used. For instance, turn types may include a prompt, a parameter value turn, a train predicate turn, and a test predicate turn. A prompt refers to a message that is presented to the teacher and/or user. A parameter value turn (ParamValueTurn) can ask the teacher and/or user a question and obtain the answer and/or confirm with the teacher and/or user that some value is correct. Any parameter value obtained can be referenced in subsequent turns (or in the current turn if it is used after the value is assigned). Below is an example of a parameter value turn that asks for and confirms the start date for a reminder application:

ParamValueTurn:
Question: <ask_start_date_language>
Confirm: You would like to start on <start_date>. Is that correct?
MistypeFollowup: What date is that? You could enter "today," "tomorrow," or a specific date such as "July 19, 2016."
Param: start_date
Type: DATE A train predicate turn (TrainPredicateTurn) can be used to train templates utilized to form a learned predicate detector, where the teacher supplies example phrases to train the desired predicate. For instance, when entering a train predicate turn, the teacher is asked to select a desired predicate (if one has not already been selected) and to type an example phrase that should fire the predicate. Dialog with the teacher is then engaged to select the correct parse, synsets, and their generalizations for the identified terms or compound terms. A synset generally refers a set of one or more synonyms that are interchangeable. In other words, synsets are sets of words having a same or similar meaning. WordNet is one example source from which synsets can be generated or obtained. WordNet can be used for a semantic taxonomy (and teachers can add or remove items from the taxonomy as needed). WordNet generally groups words into sets of synonyms (synsets), provides short definitions and usage examples, and records a number of relations among these synonym sets or their members. Based on the input provided by the teacher, a template is created and associated with the predicate. Such templates can be used to detect intent of user input, as described more fully below. The process of supplying example sentences may continue until the teacher has no further phrases desired for use, for example, when every new phrase the teacher enters is matched by an existing template.

The test predicate turn (TestPredicateTurn) displays a question to prompt the user to provide needed information. For example, for a medications tracker application in the Event Reminder class, the user might be prompted to input their prescription. The user's input can be parsed to detect matches with both built-in and learned predicates. The components of any matching predicates are mapped to the parameters defined in the RelationParamMappings field. For example, assume built-in predicates identify the frequency, time, event duration, start date, and the duration of the reminder sequence (how long the reminder should remain on the calendar). If these predicates fire based on the user's input, their slots are then assigned to the corresponding script parameters, which can then be referenced in subsequent turns, for example, to populate a confirmation question ("You would like your reminder at 7:00 a.m. Is that correct (YIN)?") rather than requesting the user to enter that value ("Please tell me what time you would like your reminder") which may generally occur if the slot is not filled.

The specification module may include additional or alternative blocks or turn types, such as, for example, set parameter values, remove parameter values, script conditional actions, user conditional actions, parameter value or constant turn, set constant values, iterations, end iteration action, end script action, no action, etc. A set parameters value (SetParamValues) enables parameter values to be set directly in the specification. A remove parameter values (RemoveParamValues) enables deleting previously assigned parameter values. A script conditional actions is similar to an if-else-then dialog flow, based on the Boolean value of a condition written in a simple conditional grammar that allows testing whether a script parameter is set or has an infinite value, comparing numeric values (=,>,⇐, etc.), and supports the use of parentheses for precedence. A user conditional action is similar to a script conditional action, but the condition is the boolean result of a question presented to a user. For example, in the reminder application, if all necessary slots are filled, the user will be presented with a single sentence to confirm. If "no" is returned, then the specification presents the required series of ParamValueTurns to extract the needed information from the user.

The parameter value or constant turn (ParamValeOrConstantTurn) is like the parameter value turn, but allows the teacher to enter a constant value if so doing is more appropriate for the app being creating. For example, a teacher creating a birthday reminder application may not want to have the application ask the user how often the reminder should occur. A set constant value sets specification variables to constant values (such as those set by ParamValueOrConstantTurn) if not already set (such as by a TestPredicateTurn). NIterations is similar to a for-loop. End iteration action is the equivalent of a break in a for-loop, with a parameter to specify ending either the innermost or all nested loops (if any). End script action ends the script with a parameter indicating success or failure.

The teacher device 206 is generally configured to facilitate designing applications. In this regard, applications can be designed based on input from a teacher. The teacher device 206 can be any computing device that can be operated by a teacher to facilitate application development. A teacher generally refers to an individual or entity that supports or facilitates application design using a module specification, for example, provided by a designer via designer device 204. In particular, a teacher can interact with a module specification to teach language skills desired to communicate with a user and/or provide input used to create an application. For instance, in response to various queries provided in the module specification, the teacher can provide input or responses that can then be used to create an application, such as application 212. Such input or responses can be provided in any manner, for example, using text or verbal responses. Further, such input or response can be used to teach language skills, that is, language instruction.

As can be appreciated, a teacher does not need application development understanding as sufficient as a software developer that develops applications in a traditional development process. Instead, a teacher may only need to be familiar with a type of application desired to be constructed and a fluent understanding of a language being used (e.g., their native language). As such, application development can be generally crowd sourced such that applications can be efficiently and effectively developed.

The application development system 212 is configured to facilitate application development. In accordance with embodiments described herein, the application development system 212 may facilitate module specification generation, application development, and/or application utilization. As previously described, such functionality may be additionally or alternatively performed by other components, such as the developer device, the designer device, the teacher device, and/or the user device.

With regard to module specification generation, the application development system 212 can obtain input, for example, provided by a designer device. In embodiments, a designer of the designer device 204 may select a class of applications for which to generate a module specification. A designer may further specify how a teacher is to build an application. Accordingly, aspects of a module specification can be entered or selected from among a plurality of specification components, such as statements, questions, syntax, combinations thereof, or the like.

Upon receiving input data, the application development system 212 can generate a module specification for a designated class of applications. In this regard, in accordance with a teacher selecting to generate an application associated with a particular class, the generated module specification can be used to interact with the teacher to obtain data such that the application can be generated. Module specifications and corresponding classes of applications can be stored such that the module specifications are accessible by any number of teachers. For example, module specifications and an indication of a corresponding application class can be stored in association with data store 218. As can be appreciated, any number of designer devices can be used to designate module specifications and corresponding application classes. As such, the data store 218 may be configured to store various module specifications from various designer devices as input by various designers.

As described, the application development system 212 may also be configured to develop applications. In this regard, the application development system 212 may communicate with a teacher device 206 to obtain input provided by a teacher. In implementation, a particular class of applications that corresponds to a desired application to be developed can be identified. In this regard, a teacher may specify an application class desired for an application to be developed. Upon identifying a class of applications, a corresponding module specification may be used to communicate with the teacher and obtain input regarding desired aspects or features of the application to be developed. In other embodiments, any or all generated module specifications may be provided to a teacher for selection thereof.

Initially, the teacher may be prompted to name the application to be developed and/or provide a description of the desired application. A teacher may also be prompted to facilitate a language instruction component of the application development. In this regard, a teacher may train a predicate or set of predicates, such as learned predicates. Learned predicates refer to predicates that are learned or trained, for example, by a human teacher. Any number of predicates may be trained. As one example, a predicate to train may relate to a type of application being developed. In this regard, the teacher teaches how to recognize when a user wants to run the application being developed. Based on the input provided by the teacher, the application development system 212 can generate learned predicates and corresponding templates.

Learned predicates can be used to model forms of meaning in language. Such learned predicates can be used to solve for particular tasks to identify intent. Further, learned predicates can be used in any other manner to discern or understand user language or intent in interacting with application 214.

For learned predicates, templates can be used to detect patterns in language. Such templates associated with learned predicates are taught rather than coded. Templates are language-based and can leverage a semantic taxonomy, as well as teacher input, to achieve generalization. In embodiments, WordNet is used for semantic taxonomy, but teachers may also both add and remove items from the taxonomy as needed.

Any given template may have an associated set of learned predicates. Whenever a template matches a piece of text, those predicates are declared true for the text. Thus, a given template can fire several different predicates. For example, the text "Jesse ate a sandwich" might fire a 'collocated' predicate, and also a 'consumes' predicate. Further, a given predicate can be fired by several different templates (e.g., "Jesse ate a sandwich" and "The milk was drunk by Jill" might both fire a "consumes" predicate).

A template may be in any of a number of different forms. In one embodiment, a template data structure can include an ordered list of items. Each item can either be a string, or a set of synsets. A template refers to a list for matching where each list element can be one of a string, single verb synset, or set of noun synsets. As can be appreciated, in other embodiments, a template may include additional or alternative parts of speech or structure. For instance, a template may include prepositions, etc. A template can include or be associated with a set of pointers to predicates that fire when template matches a portion(s) of text. As can be appreciated, learned predicates may be trained at the outset of the module specification, throughout the module specification (as needed), or at the end of the mobile specification.

Trained templates can be tested on training data to identify errors. Further, such errors can be provided to the teacher who can select to adjust the template. In this regard, the test results can be in human readable form such that the teacher can edit file to combine templates, modify one based on another, or the like.

In addition to training predicates, a teacher may also provide input used by the application development system 212 that pertains to teaching the application how to guide the user in association with the application. In this regard, a teacher may specify application components to include in a desired application. Such details may be provided in response to various questions or prompts provided in a module specification. Based on details obtained by the application development system 212, an application can be generated. FIG. 3 provides an example implementation of training a predicate. FIG. 4 provides an example implementation of training a predicate and specifying application components to include in the application.

Upon receiving input data, the application development system 212 can generate the desired application. Applications, predicates, and templates can be stored such that the applications are accessible by any number of users. For example, applications and learned predicates and templates can be stored in association with data store 218. As can be appreciated, any number of teacher devices can be used to specify input for application development. As such, the data store 218 may be configured to store various applications from various teacher devices as input by various teachers.

The application development system 212 may also be configured to utilize developed applications. In this regard, the application development system 212 may communicate with a user device 208 to implement or execute an application. As such, a generated application can be provided to the user device 208. In this manner, the user device 208 may download or install, for example, the application 214 to the user device.

In implementation, user input, such as conversational dialog, is obtained at the user device 208. The user input is analyzed to identify when a predicate occurs. For example, in accordance with embodiments described herein, detection of a predicate associated with application 214 can be detected. In this regard, detection that the user seeks to utilize the application can be used to initiate execution of the application 214. Additionally or alternatively, other user intent can be identified using templates and corresponding predicates.

In accordance with one embodiment for detecting user intent, user input (e.g., text or conversational/voice dialog) can be preprocessed. Provided herein is one example for detecting intent, but variations or alternatives may similarly be applied in accordance with embodiments of the present invention. Initially, the user's input can be parsed into sentences. Then, terminators (e.g., characters in the set {".", "!", "?"}) can be removed from the end of each sentence, and any leading or trailing space removed. The input is lower-cased, and tokens that appear in a slang map are replaced. For example, "wanna" is replaced by "want to." Apostrophes can also be removed. Various mappings can be implemented, for example, corresponding to an internal model of time intervals. By way of example only, strings matching the pattern "#-#", where # represent an integer (i.e., dashed intervals), are mapped to "# to #". Thus, for example, the string "3-4" is mapped to the string "3 to 4". As another example, strings matching the pattern "# x/T", where # is an integer and T is one of the hardwired time intervals (e.g., day) (i.e., slashed intervals) can be expanded to the form "# times per T". Tokens can be mapped to lemmas. For example, assume two files exist, one that lists verbs and their declinations and one that lists nouns and their plurals. If a token appears as a declination of a verb and does not appear in the noun list, that token is declared to have type verb. If a token appears as a noun or its plural, and does not appear in the verb list, then it is declared to be a type of noun. If it appears in both lists, its type is listed as either verb or noun. In embodiments, tokens are replaced by their lemmas, and for verbs, their declination is mapped to one of Past, PresentOrFuture, PastPresentOrFuture. A parsed components list can then be constructed for the sentence. Using the parsed component list, tokens can be matched to possible parts of speech.

Template matching can then be performed in connection with the user input to identify any templates that match the user input. To do so, templates can be scanned over text. In some cases, list elements must match in order. In embodiments, for a verb to match, its tense must also match, and for a synset set to match, one or more synsets in the set must match. A template may contain predicates, and a predicate may be pointed to by multiple templates. In embodiments, when detecting built-in predicates, in some cases, more complex patterns are checked first. Based on a template matching a user input, the corresponding predicate can be identified as true and language intent identified. Such language intent identification can then be used in implementing the application. As can be appreciated, both built-in predicates and learned predicates can be used to identify user intent based on the user's input (e.g., via conversational dialog or written text). Further, user intent can be identified in accordance with various aspects of the application. By way of example only, a learned predicate may be used to identify a user's intent to utilize the application, a built-in predicate may be used to identify a frequency and/or dates associated with a reminder, and another learned predicate may be used to identify a user's desire to add notes or comments to a reminder. FIG. 5 provides an example implementation of utilizing an application to create a reminder, including input provided by a user.

Exemplary Application Development Implementations

Figure 6:
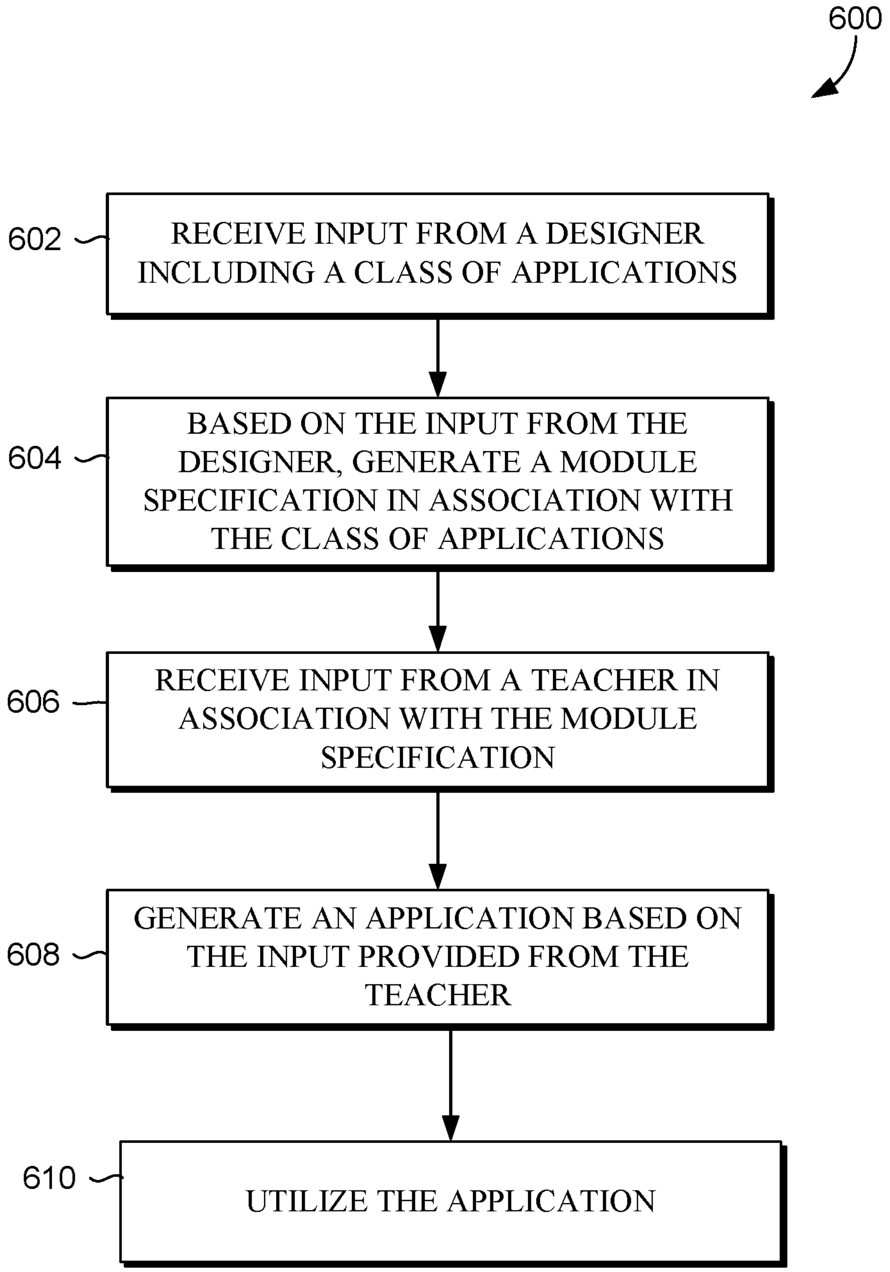
FIG. 6 is a flow diagram that illustrates an exemplary method for facilitating application development, in accordance with an aspect of the technology described herein.
Figure 7:
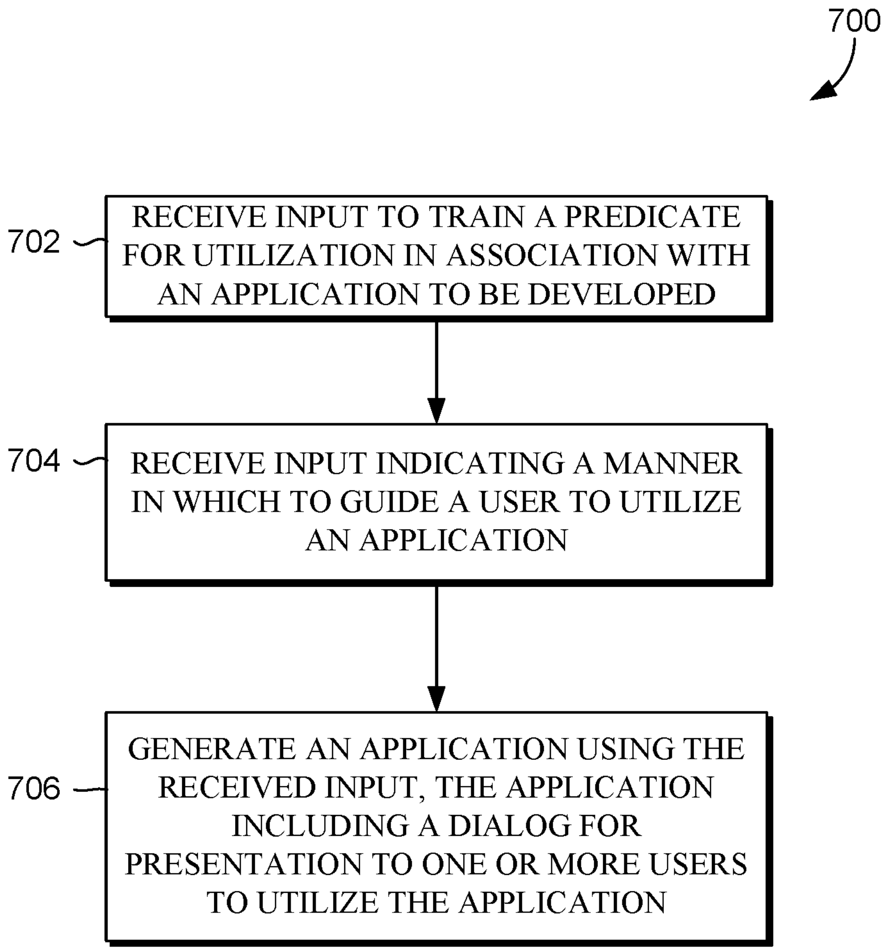
FIG. 7 is a flow diagram that illustrates another exemplary method for facilitating application development, in accordance with an aspect of the technology described herein.
Figure 8:
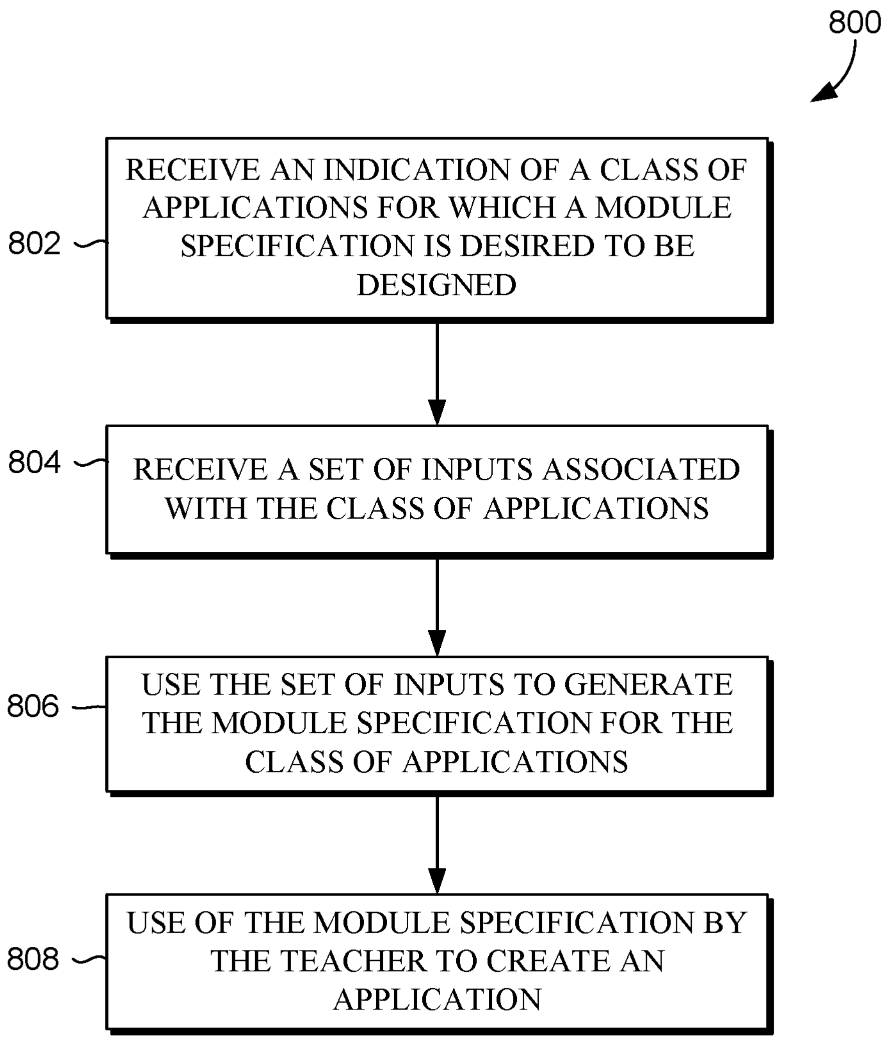
FIG. 8 is a flow diagram that illustrates another exemplary method for facilitating application development, in accordance with an aspect of the technology described herein.

As described, various application development implementations can be used in accordance with embodiments of the present invention. FIGS. 6-8 provide exemplary methods of implementing application development, in accordance with various embodiments of the present invention. The methods 600, 700, and 800 can be performed by a computer device, such as device 100 described previously. The flow diagrams represented in FIGS. 6-8 are intended to be exemplary in nature and not limiting.

Turning initially to FIG. 6, FIG. 6 provides a method 600 for facilitating application development. At block 602, input from a designer is received. The input includes an indication of a class of applications and a preference(s) for designing a module specification. At block 604, a module specification is generated in association with the class of applications. The module specification is generally generated based on the input provided by the designer, for example, using the Module Specification Language. At block 606, input is received from a teacher in association with the module specification. Such input can, among other things, indicate how to recognize when a user intends to run an application. At block 608, an application is generated based on the input provided from the teacher. The application can then be used by one or more users, as indicated at block 610.

Turning now to FIG. 7, FIG. 7 provides a method 700 for facilitating application development. Initially, at block 702, input is received to train a predicate for utilization in association with an application to be developed. At block 704, input is received indicating a manner in which to guide a user to utilize an application. At block 706, an application is generated using the received input, the application including a dialog for presentation to one or more users to utilize the application.

FIG. 8 provides another example method 800 for facilitating application development. Initially, at block 802, an indication of a class of applications for which a module specification is desired to be designed is received. Such a module specification can enable application development. At block 804, a set of inputs associated with the class of applications is received. The set of inputs may indicate a dialogue to use with a teacher to obtain information to create an application. Thereafter, at block 806, the set of inputs is used to generate the module specification for the class of applications. At block 808, the module specification is used by the teacher to create an application.

The technology described herein has been described in relation to particular aspects, which are intended in all respects to be illustrative rather than restrictive.

What is claimed is:

1. A computing system comprising:

a processor; and computer storage memory having computer-executable instructions stored thereon which, when executed by the processor, configure the computing system to facilitate application development, the computing system configured to:

receive input from a designer for designing a module specification that is configured for generating applications within a particular class of applications, wherein the designer specifies how teachers generate applications using the module specification;

generate the module specification in association with the class of applications, based on the input from the designer, wherein the module specification includes a teach block;

responsive to a teacher accessing the module specification having the teach block, utilize the teach block that elicits information from the teacher to receive input from the teacher in association with the module specification, wherein at least a portion of the input received by the teach block:

indicates how to recognize a user intent, is used for training a predicate for utilization in association with an application to be developed, wherein the predicate is a function that returns a true or false value, and indicates a manner in which to guide a user to utilize the application to be developed; and generate the application based on the input provided from the teacher, the application being usable by one or more users.

2. The computing system of claim 1, wherein the module specification is usable to generate a plurality of applications associated with the class of applications.

3. The computing system of claim 1, wherein the module specification including the teach block comprises predicate detecting turns and parameter values turns.

4. The computing system of claim 1, wherein the at least the portion of the input indicating how to recognize the user intent comprises an example text or verbal dialog.

5. The computing system of claim 4, wherein the example text or verbal dialog comprises a phrase or a sentence.

6. The computing system of claim 1 further comprising using the input from the teacher to generate a template and a corresponding predicate.

7. The computing system of claim 6, wherein the template and corresponding predicate is utilized to detect intent of a user to use the application.

8. The computing system of claim 1, wherein the application utilizes one or more built-in predicates to detect intent of the user.

9. A computer-implemented method for facilitating application development, the method comprising:

responsive to a teacher accessing a module specification including a teach block that elicits information from the teacher, wherein the module specification is configured for generating applications within a particular category of applications, receiving input from the teacher by way of the teach block to train a predicate for utilization in association with an application to be developed, wherein the predicate is a function that returns a true or false value, and wherein the input from the teacher indicates a manner in which to guide a user to utilize the application to be developed; and generating the application using the received input, the application including a dialog for presentation to one or more users to utilize the application.

10. The method of claim 9, wherein based on the input to train the predicate, generating a template used to comprehend language input from the one or more users.

11. The method of claim 9, wherein the input to train the predicate comprises at least one or more example verbal or text phrases.

12. The method of claim 9, wherein the input to train the predicate comprises one or more parts of speech indications.

13. The method of claim 9, wherein the input to train the predicate comprises one or more definition indications that indicate a specific definition appropriate for a term.

14. The method of claim 9, further comprising using the application to perform an event.

15. The method of claim 9, wherein the application is used by an automated personal assistant to perform an event.

16. The method of claim 14, wherein the application is used to perform the event based on input provided by a user.

17. One or more computer storage media having computer-executable instructions stored thereon which, when executed by a processor, are configured to perform a method to facilitate application development, the method comprising:

receiving a class indicator that identifies a particular class of applications for which a module specification is desired to be designed, the module specification enabling application development within the class of applications;

receiving a set of inputs associated with the class of applications, the set of inputs indicating prompts and questions to use with a teacher to obtain information to create an application; and using the set of inputs to generate the module specification for the class of applications, wherein the module specification is used by the teacher to create the application, and wherein the module specification includes a teach block that elicits information from the teacher, wherein the information from the teacher received by the teach block:

is used for training a predicate for utilization in association with an application to be developed, wherein the predicate is a function that returns a true or false value; and indicates a manner in which to guide a user to utilize the application to be developed.

18. The media of claim 17 further comprising providing an indication of the module specification for selection by the teacher.

19. The media of claim 17, wherein the teach block is configured to teach or train one or more predicates.

20. The media of claim 19, wherein the teach block is configured to design a series of questions intended to leverage the teacher's language skills to teach the application language comprehension.

* * * * *